United States Patent
Kobayashi

(10) Patent No.: US 6,464,536 B1
(45) Date of Patent: Oct. 15, 2002

(54) INFORMATION CARD AND BACK CONNECTOR OR CARD BLANK FOR THE SAME

(75) Inventor: Hiroyuki Kobayashi, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 966 days.

(21) Appl. No.: 08/740,949

(22) Filed: Nov. 5, 1996

(30) Foreign Application Priority Data

Nov. 15, 1995 (JP) .............................................. 7-296590

(51) Int. Cl.[7] .............................................. H01R 13/648
(52) U.S. Cl. ........................................ 439/607; 439/108
(58) Field of Search ................................ 439/607, 609, 439/101, 108, 608, 610

(56) References Cited

U.S. PATENT DOCUMENTS 5,288,247 A * 2/1994 Kaufman ..................... 439/101
5,547,397 A * 8/1996 Hirai .......................... 439/607

* cited by examiner

Primary Examiner—P. Austin Bradley
(74) Attorney, Agent, or Firm—Kanesaka & Takeuchi

(57) ABSTRACT

An information card has upper and lower metallic panels and a back connector with a plug opening exposed at an end face of the card. A cutout is provided in the shield shell of the back connector on the side of the plug opening. A folded portion is provided on the metallic panel on the side of the plug opening and fitted in the cutout of the shield shell and brought into contact with the ground element of a mating connector.

4 Claims, 4 Drawing Sheets

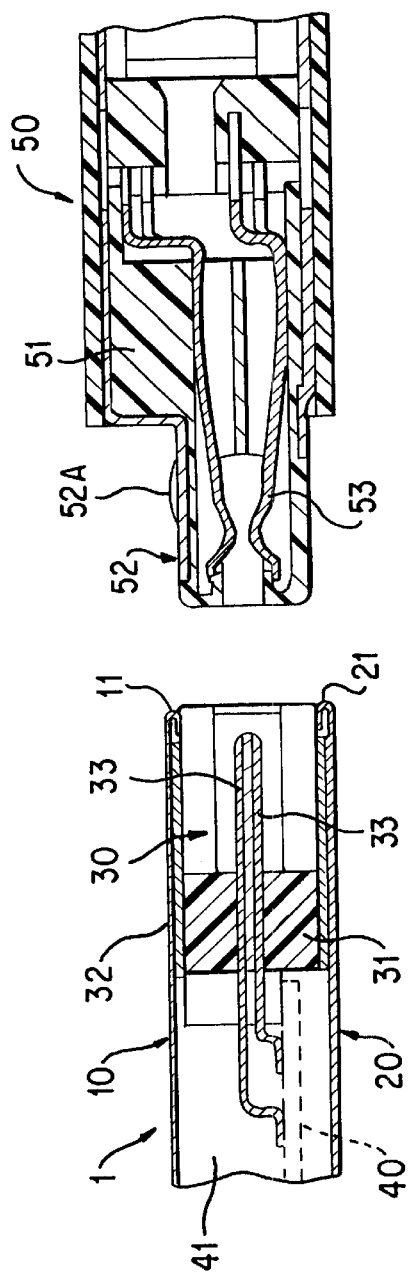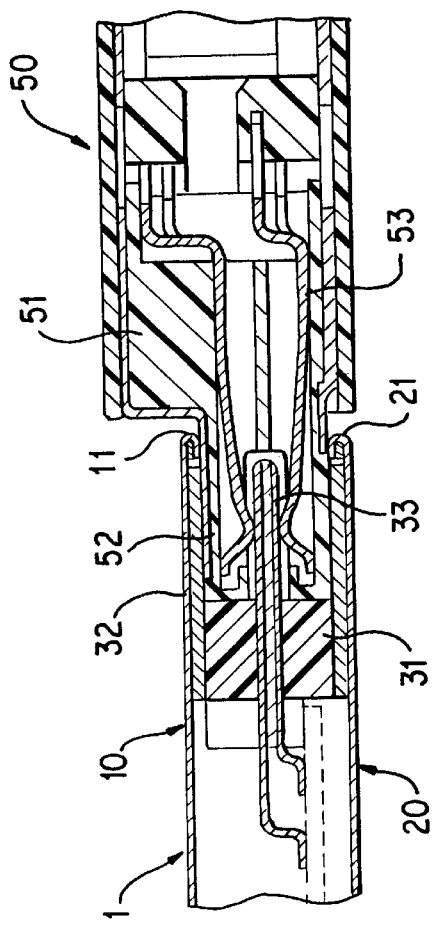

INFORMATION CARD AND BACK CONNECTOR OR CARD BLANK FOR THE SAME

BACKGROUND OF THE INVENTION

1. Field of the Invention

The present invention relates to information cards, such as IC cards or PC cards, from which information is retrieved or in which information is stored and back connectors or card blanks for such information cards.

2. Description of Related Art

Information cards, such as IC cards or PC cards, are widely used as external memories for electronic equipment. Information cards includes a card-like insulating housing and a printed circuit board on which semiconductor memories (RAM, ROM, etc.), a microcomputer, and/or a back-up battery are mounted.

Back connectors are provided in the PC cards for connection to other electronic equipment. A pair of parallel metallic panels are provided on a back connector for noise control and/or structural reinforcement.

The metallic panels of a conventional PC card have cut edges on the side of a plug opening, frequently causing cut injury in the hand during operation. The plug opening of a connector is used for connection to other electronic equipment and handled more frequently than other parts of the connector, increasing the frequency of cutting.

In the conventional PC cards, the ground connection to a mating connector plug is made via the shield shell of a back connector and the printed circuit board, making indirect connection to the metallic panel of a PC card.

For example, Japanese utility model patent application Kokai No. 115581/89 discloses an IC card having a metallic panel with an edge extended and folded so that it is disposed in front of the plug opening. In such a structure, the cut faces of a metallic panel are not exposed, and the ground terminal of a mating connector is brought into direct contact with the metallic panel of an IC card. However, the edge of the metallic panel is extended forwardly to a large extent so that the entire IC card becomes large by that much.

Japanese patent application Kokai Nos. 186391/89 and 186392/89 disclose an IC card having a metallic cover with its edge folded inwardly toward the plug opening of a mating connector. The folded edge reinforces the metallic cover and/or prevents malfunction or breakdown of the internal IC elements by electrostatic charge but does not make direct contact with the ground of a mating connector. Consequently, the ground connection for the conventional IC card is made indirectly via the receptacle of the IC card and then the card body.

SUMMARY OF THE INVENTION

Accordingly, it is an object of the invention to provide an information card, and a back connector or card blank for the information card which are free from the aforementioned problem.

According to one aspect of the invention there is provided an information card which includes a pair of parallel metallic panels forming a housing and each having folded portions at an end of the housing; a back connector provided between the metallic panels such that its plug opening is exposed at the end face of the housing; a shield shell covering the back connector; and a cutout portion provided on a side of the plug opening for receiving the folded portions so that the folded portions are brought into contact with a ground element of a mating connector.

According to another aspect of the invention there is provided a back connector for an information card having a pair of parallel metallic panels having folded portions folded inwardly at their ends, which includes a shield shell fitted in the information card such that its plug opening is exposed at an end face of the information card and a cutout portion provided in the shield shell for receiving the folded portions.

According to still another aspect of the invention there is provided an information card which includes a pair of parallel metallic panels forming a housing; a back connector disposed in the housing such that its plug opening is exposed at an end face of the housing; and folded portions made by folding an edge of the metallic panels on a side of the plug opening so as to provide a shield shell for the back connector.

According to yet another aspect of the invention there is provided a card blank for an information card having a pair of parallel metallic panels forming a housing and a back connector provided in the housing such that its plug opening is exposed at an end face of the housing, comprising folded portions made by folding edges of the metallic panels on a side of the plug opening so as to provide a shield shell for the back connector.

BRIEF DESCRIPTION OF THE DRAWINGS

FIG. 2 is a sectional view of a part of the PC card in front of a mating connector plug;

FIG. 3 is a sectional view of a part of the PC card plugged to the mating connector plug;

DESCRIPTION OF THE PREFERRED EMBODIMENT

Embodiments of the invention will be described below with reference to the accompanying drawings.

Figure 1:
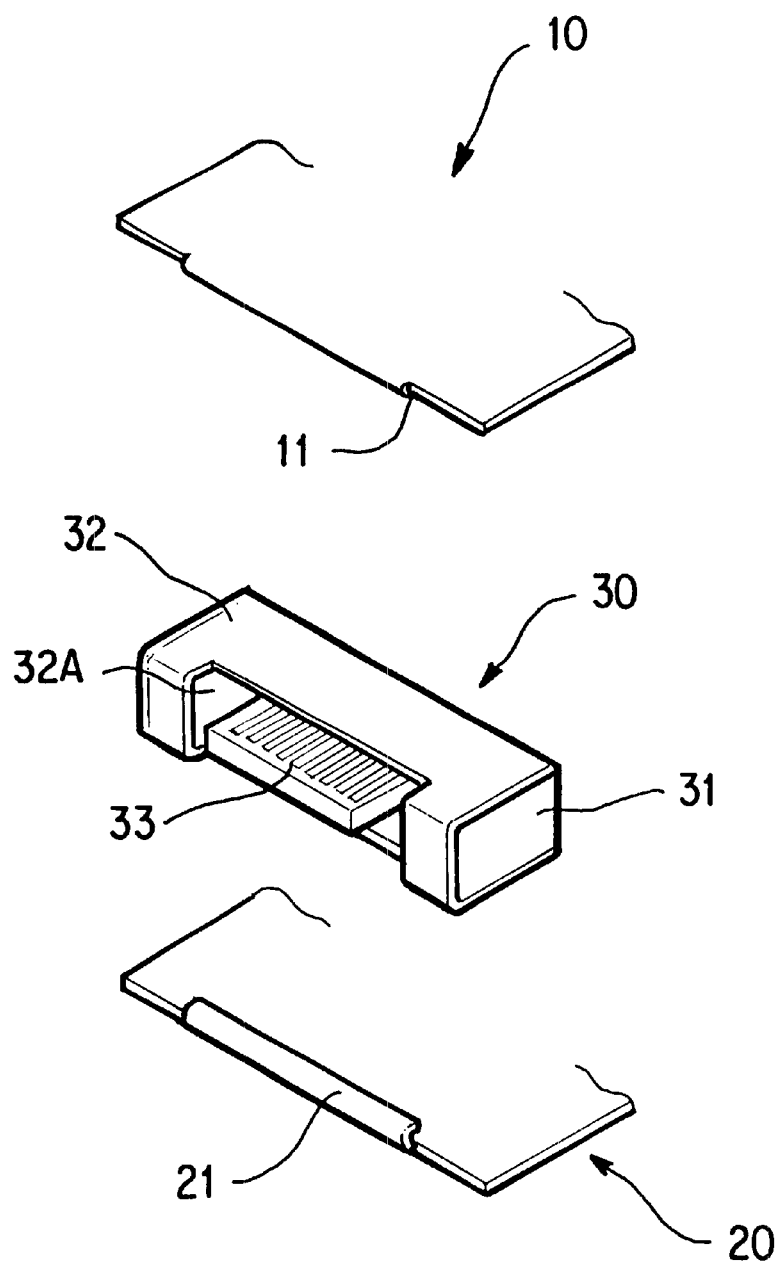
FIG. 1 is an exploded perspective view of a part of a PC card according to an embodiment of the invention.

FIG. 1 shows a back connector for a PC card according to an embodiment of the invention, wherein a card-like insulating housing of the PC card is removed. The card-like insulating housing accommodates a printed circuit board on which IC devices, such as semiconductor memories and a microcomputer, and a backup battery are mounted. However, this is conventional, and its detailed description is omitted.

The PC card includes a card-like insulating housing 41 (FIGS. 2 and 3) in which a printed circuit board 40 is mounted, metallic upper and lower panels 10 and 20 put on the insulating housing 41, and a back connector 30 flanked by the metallic panels 10 and 20 such that its plug opening is exposed at an end face of the insulating housing 41. The metallic panel 10 is made from a thin conductive metallic sheet so as to provide a folded portion 11 folded back toward inside. Similarly, the metallic panel 20 is made from a thin conductive metallic sheet so as to provide a folded portion 21 folded back toward inside.

The back connector 30 includes an insulating block 31 having a protruding portion on which contact terminals 33 are arranged and a conductive shield shell 32 put on the insulating block 31 such that it surrounds the plug opening. A cutout portion 32A is provided in the shield shell 32 on the side of the plug opening. The cutout portion 32A is dimensioned so as to receive the folded portions 11 and 21 of the metallic panels 10 and 20.

FIG. 2 shows, in section, a, part of the PC 1 card which is made up of the metallic panels 10 and 20 and the back connector 30, facing a mating connector plug. As described above, the PC card 1 consists of the card-like insulating housing 41 accommodating the printed circuit board 40, the back connector 30 mounted in the housing 41 such that its plug opening is exposed at the end face of the housing 41, and the metallic panels 10 and 20 for covering the upper and lower surfaces of the housing 41. The folded portions 11 and 21 of the metallic panels 10 and 20 are fitted in the cutout portion 32A of the shield shell 32. The connection portions of the contact terminals 33 in the back connector 30 are electrically connected to the corresponding conductors of the printed circuit board 40.

The mating connector plug 50 is conventional. For example, it includes an insulating block 51 having a plug projection which is dimensioned so as to fit in the plug opening of the back connector 30, contact terminals 53 provided in the plug projection, and a grounding plate 52 with a contact projection 52A provided on the surface of the plug projection.

FIG. 3 shows, in section, the PC card 1 plugged to the mating connector plug 50. The contact terminals 53 of the mating connector plug 50 are brought into electrical contact with the contact terminals 33 of the back connector 30 while the ground plate 52 of the mating connector plug 50 is brought into electrical contact with the shield shell 32 of the back connector 30 via the compressed contact projection 52A and the folded portions 11 of the metallic panel 10. This makes it possible to connect the metallic panel 10 directly to the ground of the mating plug 50 by bypassing the back connector 30.

Figure 4:
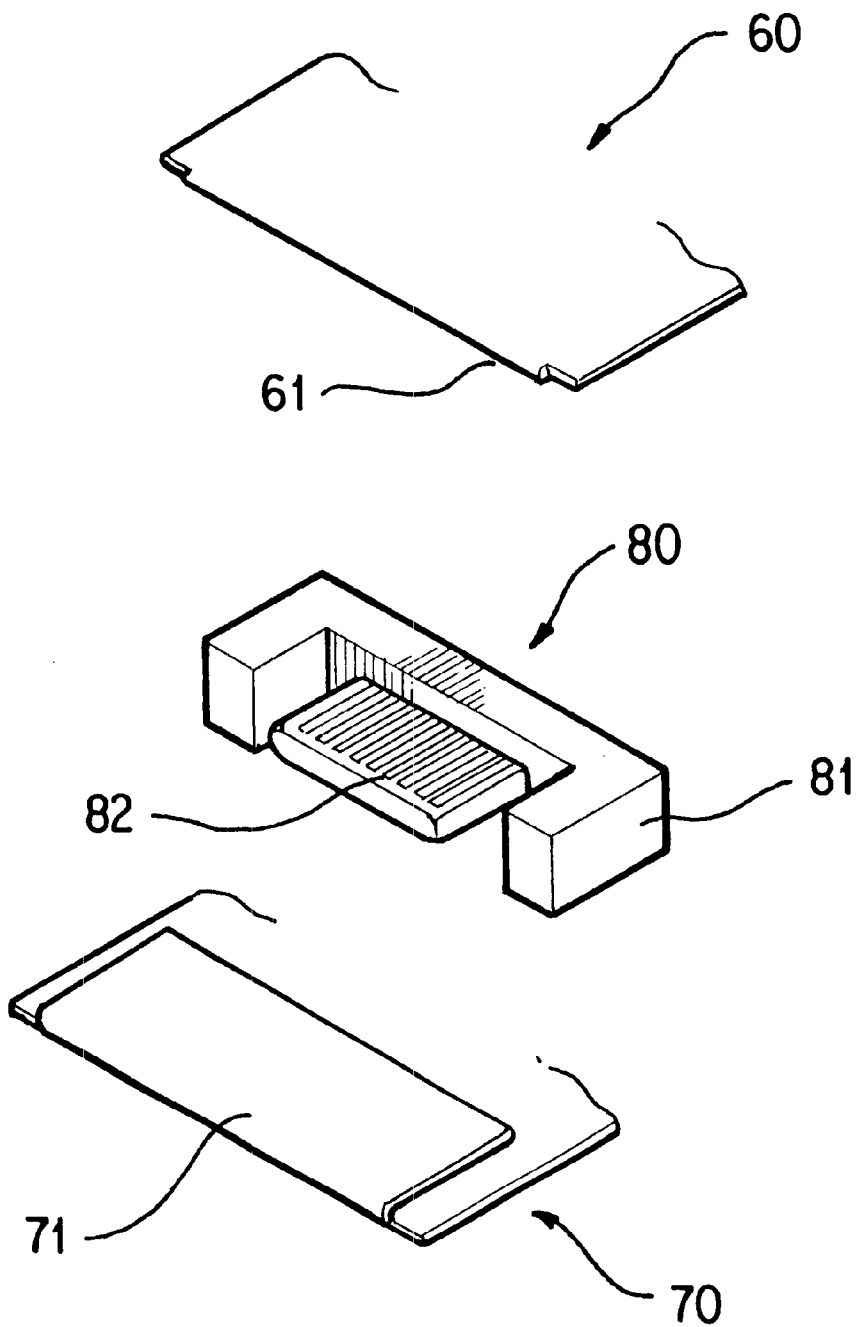
FIG. 4 is an exploded perspective view of a part of a PC card according to another embodiment of the invention.

FIG. 4 shows a back connector for a PC card according to another embodiment of the invention. As in FIG. 1, the card-like insulating housing of the PC card is omitted from the figure. The PC card includes an insulating housing 41A (FIGS. 5 and 6) accommodating a printed circuit board 40, upper and lower metallic panels 60 and 70 put on the insulating housing 41A, and a back connector 80 flanked by the metallic panels 60 and 70 such that its plug opening is exposed at an end face of the insulating housing 41A. The metallic panels 60 and 70 are made from a thin conductive metallic sheet so as to provide a folded portion 61 or 71 folded inwardly. The folded portions 61 and 71 are made much longer than the folded portions 11 and 21 in the embodiment of FIGS. 1–3 for the reasons described hereinafter.

The back connector 80 includes an insulating block 81 having a protruding portion on which contact terminals 82 are arranged. The back connector 80 is not provided with such a shield shell as that of the embodiment of FIGS. 1–3. As will be described hereinafter with reference to FIGS. 5 and 6, the shield shell of the back connector 80 in this embodiment is made up of the folded portions 61 and 71 of the metallic panels 60 and 70.

Figure 5:
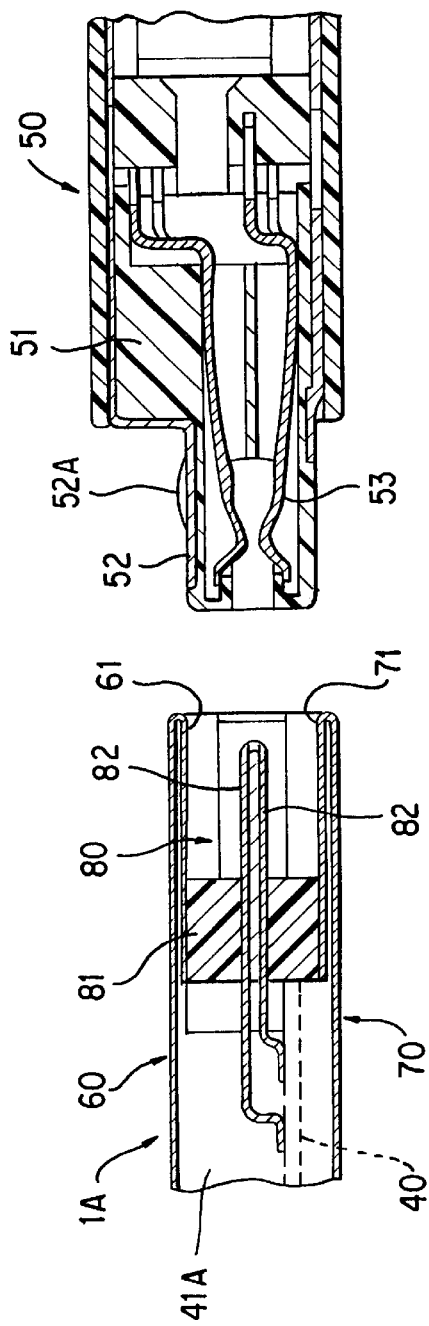
FIG. 5 is a sectional view of a part of the PC card of FIG. 4 in front of a mating connector plug.

FIG. 5 shows, in section, a part of the PC card, which is made up of the metallic panels 60 and 70 and the back connector 80, facing a mating connector plug. As described above, the PC card 1A includes the insulating housing 41A accommodating a printed circuit board 40 on which IC devices, such as memories, are mounted, the back connector 80 put in the housing 41A such that its plug opening is exposed at an end face of the housing 41A, and the metallic panels 60 and 70 put so as to cover the upper and lower surfaces of the housing 41A. Consequently, the folded portions 61 and 71 of the metallic panels 60 and 70 form a shield shell for the back connector 80. The connection portions of contact terminals 82 are electrically connected to corresponding conductors of the printed circuit board 40. The mating connector plug 50 for the PC card 1A is conventional as described with reference to FIG. 2.

Figure 6:
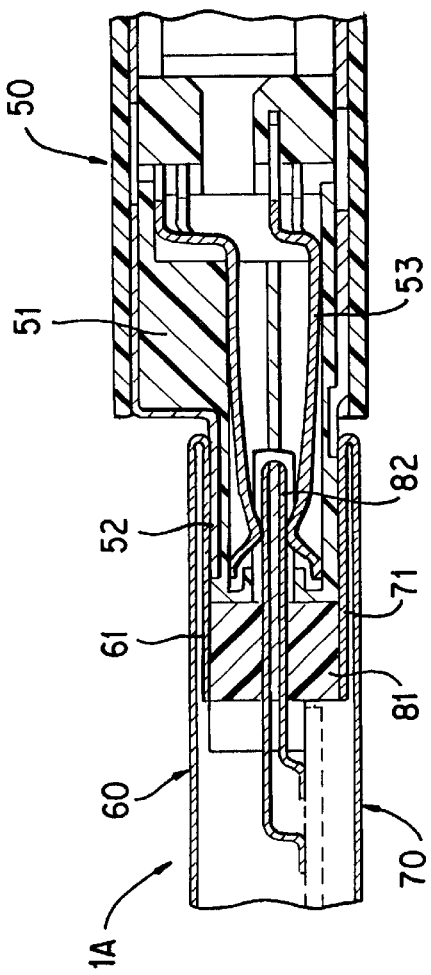
FIG. 6 is a sectional view of a part of the PC card of FIG. 5 plugged to the mating connector plug.

FIG. 6 shows the PC card 1A plugged to the mating connector plug 50. The contact terminals 53 of the mating connector plug 50 are brought into electrical contact with the contact terminals 82 of the back connector 80 while the ground plate 52 of the mating connector plug 50 is brought into electrical contact with the folded portion 61 of the metallic panel 60 via the compressed contact projection 52A. This makes it possible to connect the metallic panel 60 directly to the ground of the mating connector plug 50 by bypassing the back connector 80.

The invention is applied to the PC card in the above embodiments but it is applicable to other information cards as well.

According to the invention, the sectional area of the metallic panel at the plug opening of a PC card is minimized without wasting the space of an information card, such as a PC card (or changing the size of a PC card), the danger of injuring a hand is avoided, and the car appearance is beautified.

Since the metallic panels at the plug opening (to which forces are applied upon plugging) are folded back, the PC card and the plug opening are reinforced.

The ground of a mating connector is directly connected to the metallic panel by bypassing the connector of a PC card.

In the embodiment of FIGS. 4–6, the structure of the back connector is simplified, and the manufacturing cost is minimized.

What is claimed is:

1. An information card comprising:

a pair of parallel metallic panels forming a housing and each having a folded-back portion at an end face of said housing, said folded-back portion being continuous substantially across a width of said metallic panel;

a back connector provided between said metallic panels and having a plug opening exposed at said end face of said housing;

a shield shell covering said back connector; and a cutout portion provided in said shield shell on a side of said plug opening for receiving said folded-back portions such that said folded-back portions form upper and lower edges of said plug opening such that when a mating connector is plugged into said plug opening, said folded-back portions are brought into contact with a ground element of said mating connector.

2. A back connector for an information card which has a pair of parallel metallic panels having folded-back portions folded back inwardly at their ends, comprising:

a shield shell fitted in said information card such that its plug opening is exposed at an end face of said information card and a cutout portion provided in said shield shell for receiving said folded-back portions such that said folded-back portions form upper and lower edges of said plug opening such that when a mating connector is plugged in, said folded-back portions are brought into contact with a ground element of said mating connector.

3. An information card comprising:

a pair of parallel metallic panels forming a housing;

a back connector disposed in said housing such that its plug opening is exposed at an end face of said housing;

a pair of folded-back portions made by folding back an edge of each of said metallic panels on a side of said plug opening so as to provide a shield shell for upper and lower sides of said back connector such that when a mating connector is plugged in, said folded-back portions are brought into contact with a ground element of said mating connector; and an insulating housing for back connector having a cutout portion for receiving said folded-back portions to thereby minimize a thickness of said information card and maximize a strength of said plug opening.

4. A card blank for an information card which has a pair of parallel metallic panels forming a housing and a back connector provided in said housing such that its plug opening is exposed at an end face of said housing, comprising:

a pair of folded-back portions made by folding edges of said metallic panels on a side of said plug opening so as to provide a shield shell for upper and lower sides of said back connector such that when a mating connector is plugged in, said folded-back portions are brought into contact with a ground element of said mating connector; and an insulating housing for said back connector having a cutout portion for receiving said folded-back portions to thereby minimize a thickness of said information card and maximize a strength of said Plug opening.

* * * * *